United States Patent [19]

Zalm

[11] 4,399,456
[45] Aug. 16, 1983

[54] THREE-DIMENSIONAL TELEVISION PICTURE DISPLAY SYSTEM AND PICTURE PICK-UP DEVICE AND PICTURE DISPLAY DEVICE SUITABLE THEREFOR

[75] Inventor: Peter C. Zalm, Eindhoven, Netherlands

[73] Assignee: U.S. Philips Corporation, New York, N.Y.

[21] Appl. No.: 304,540

[22] Filed: Sep. 23, 1981

[30] Foreign Application Priority Data

Oct. 14, 1980 [NL] Netherlands ........................ 8005650

[51] Int. Cl.³ ............................................. H04N 9/54
[52] U.S. Cl. .................................... 358/92; 350/132; 350/143; 358/253
[58] Field of Search ..................... 358/88, 91, 92, 253; 350/132, 143

[56] References Cited

U.S. PATENT DOCUMENTS

| | | | |
|---|---|---|---|
| 2,783,406 | 2/1957 | Vanderhooft | 358/91 |
| 2,832,821 | 4/1958 | Du Mont | 358/253 |
| 2,845,618 | 7/1958 | Huffman | 358/88 |
| 2,849,917 | 9/1958 | Petri | 350/143 |
| 3,597,042 | 8/1971 | Favre | 350/132 |
| 3,737,567 | 6/1973 | Kratomi | 358/92 |
| 3,986,027 | 10/1976 | Holmes | 358/91 |
| 3,992,573 | 11/1976 | White | 358/92 |
| 4,021,846 | 5/1977 | Roese | 358/92 |

FOREIGN PATENT DOCUMENTS 1160763 8/1969 United Kingdom ................ 358/253

*Primary Examiner*—Howard Britton
*Attorney, Agent, or Firm*—Jack Oisher; William J. Streeter; Edward W. Goodman

[57] ABSTRACT

A three-dimensional television picture display system in which information intended for the right and left eye, respectively, of an observer is generated on a display screen (11, 20) in respective first and second images (V1, V2) which are shifted into the direction of line scan. In order to prevent eye strain due to conflicting depth information and any resultant headache, irritation and discomfort, the periodic line blanking of the second image (V2) intended for the left eye is shifted into the direction of line scan at picture generation on the display screen (11, 20) relative to the periodic line blanking of the first image (V1) intended for the right eye. The three-dimensionally shifted line blanking can be realized either electronically (6, 7; 22) or by providing on either side of the display screen (20) of the picture display device (19) strips (HB1, HB2) which transmit/do not transmit information.

7 Claims, 2 Drawing Figures

THREE-DIMENSIONAL TELEVISION PICTURE DISPLAY SYSTEM AND PICTURE PICK-UP DEVICE AND PICTURE DISPLAY DEVICE SUITABLE THEREFOR

BACKGROUND OF THE INVENTION

The invention relates to a three-dimensional television picture display system comprising a picture pick-up device and a picture display device having a picture display screen and scanning means for performing, in scanning periods, and with blanking periods a periodic scanning operation of the screen at line and field frequency for generating on the screen a picture corresponding to the original scene recorded with the pick-up device, information which is intended for the right and for the left eye, respectively, of an observer being present in this picture in first and second images, respectively, the images being shifted in the direction of line scan, which, for an entire, image information-separated observation with two eyes results in a three-dimensional picture, and to a picture pick-up device and a picture display device suitable therefor.

Three-dimensional television picture display systems are described in an article in the periodical "Journal of the SMPTE", July 1971, pages 539 to 544, inclusive. The article describes several possible implementations, use being made or not being made of, for example, spectacles having special lenses or of lenticular strips provided on the screen into the direction of field scan. Apart from the construction, it holds for every possibility that two independent images must be seen individually by the eye for which it is intended and not by the other eye. In addition, the depth range and the depth resolution in the picture to be observed are of importance. The article mentions several criteria for display systems which must be satisfied to prevent eye strain resulting in headaches, irritation and discomfort for the observer.

In practice it has appeared that a negative criticism by the observer of three-dimensional television pictures particularly occurred after observation for a longer period of time. This is caused by the effort of the observer to form a three-dimensional sensation from the displayed two-dimensional television picture. It has appeared that particularly conflicting depth information results in a negative criticism.

SUMMARY OF THE INVENTION

The invention has for its object to eliminate a cause of conflicting depth information, resulting in positive criticism of a picture. A display device in accordance with the invention is therefore characterized in that when a picture is generated on the picture display screen, the periodic line blanking of the second image intended for the left eye is shifted in the direction of line scan relative to the periodic line blanking of the first image intended for the right eye.

The invention is based on the recognition that very disturbing, conflicting depth information in the picture particularly occurs at the left-hand and the right-hand side of the display screen, that is to say at the beginning and at the end of the line scan, and that it can be prevented by performing the line blanking in the shifted, three-dimensional manner. This accomplishes that only the right and left eye, respectively, of the observer sees information at the left-hand and right-hand side, respectively, of the display screen and consequently is not offered conflicting depth information as is the case when both eyes are offered information from either side of the screen. In practice, the three-dimensionally shifted line blanking results in a considerable improvement of the picture quality.

A simple construction of a system comprising a picture pick-up device comprising a first and a second television camera which, on recording, represent the right and the left eye, respectively, also comprising a signal generator for producing synchronizing and blanking signals, in which system the shifted line blanking is accomplished in an electronic, simple manner, is characterized in that the picture pick-up device comprises a first and a second line blanking circuit each having a control input for receiving a line blanking signal and a signal input for connection to an output of the first and of the second television camera, respectively, said camera outputs being intended to carry signals representing the scene, a signal generator output for carrying a line blanking signal being connected to the control input of the first line blanking circuit and, via a delay device, to the control input of the second line blanking circuit.

A further simple embodiment is characterized in that outputs of the first and second line blanking circuits are connected to inputs of a change-over device which has a control input which is connected to an output of the signal generator for carrying a field change-over signal, an output of the change-over device being coupled to an output terminal of the picture pick-up device.

An embodiment of a system comprising a pick-up device having a first and a second television camera which on recording represent the right and the left eye, respectively, and a signal generator producing synchronizing and blanking signals, in which system the shifted line blanking may be optionally realized in an electronic or a non-electronic manner, is characterized in that outputs of the first and the second television cameras, which are intended to carry the signals representing the scene, are connected to inputs of a first change-over device having a control input which is connected to an output of the generator for carrying a field-change-over signal, an output of the first change-over device being coupled to an output terminal of the picture pick-up device.

A further simple embodiment of the system in which the line blanking is performed electronically is characterized in that the output terminal of the picture pick-up device and an output of a first picture storage device, which has an input for connection to the output terminal of the picture pick-up device, respectively, is connected to a signal input of a line blanking circuit which has a signal output for connection to an input of the picture display device and of a second picture storage device, respectively, and a control signal input for receiving a line blanking signal, this control input being connected to an output of a second change-over device having a first and a second signal input which are connected directly and via a delay device, respectively, to an output of the signal generator for carrying a line blanking signal, said second change-over device having a control input which is connected to an output of the signal generator for carrying a field change-over signal.

A further simple embodiment of the system in which the shifted line blanking is performed non-electronically, is characterized in that the picture display device in the system has an input intended to be connected to the output terminal of the picture pick-up device and to an output of a picture storage device having an input for connection to the output terminal of the picture pick-up device, respectively, a vertical strip being provided transversely of the direction of line scan on either side of the display screen of the picture display device, the strip, present on the display screen at the beginning and at the end of the line scan, respectively, not transmitting the information locally generated in the second and first image, respectively, intended for the left and right eye, respectively, of the observer.

A picture display device suitable for the last-mentioned system and which may also be employed for standardized television, is characterized in that on either side of the display screen of the picture display device, there is provided a vertical strip which is positioned transversely of the direction of line scan and which is removable from the screen, the left-hand and right-hand strip, respectively, relative to the observer, not transmitting information intended for the left and right eye, respectively, of the observer.

A further picture display device in which the observer can optionally adjust the extent to which the line blanking is shifted three-dimensionally, is characterized in that the vertical strips are movable in the horizontal direction at the edge of the display screen.

A picture display device provided with strips on the display screen which, in general terms, diminish the brightness of the picture, is characterized in that a removable neutral-density filter is provided on the display screen between the said strips.

A further advantage of the use of such a neutral density filter is that it reduces reflections of extraneous light on the display screen.

A picture display device in the form of a projection picture display device which is adapted in a simple manner for performing the three-dimensionally shifted line blanking, is characterized in that the device comprises a projection picture tube having a display screen on which on either side a strip is provided which is positioned transversely of the direction of line scan and is removable from the screen, the strip being present at the beginning and end, respectively, of the line scan, not passing information intended for the left and the right eye, respectively, of the observer.

DESCRIPTION OF THE DRAWING

The invention will now be further described with reference to the accompanying drawing in which.

DESCRIPTION OF THE PREFERRED EMBODIMENT

Figure 1:
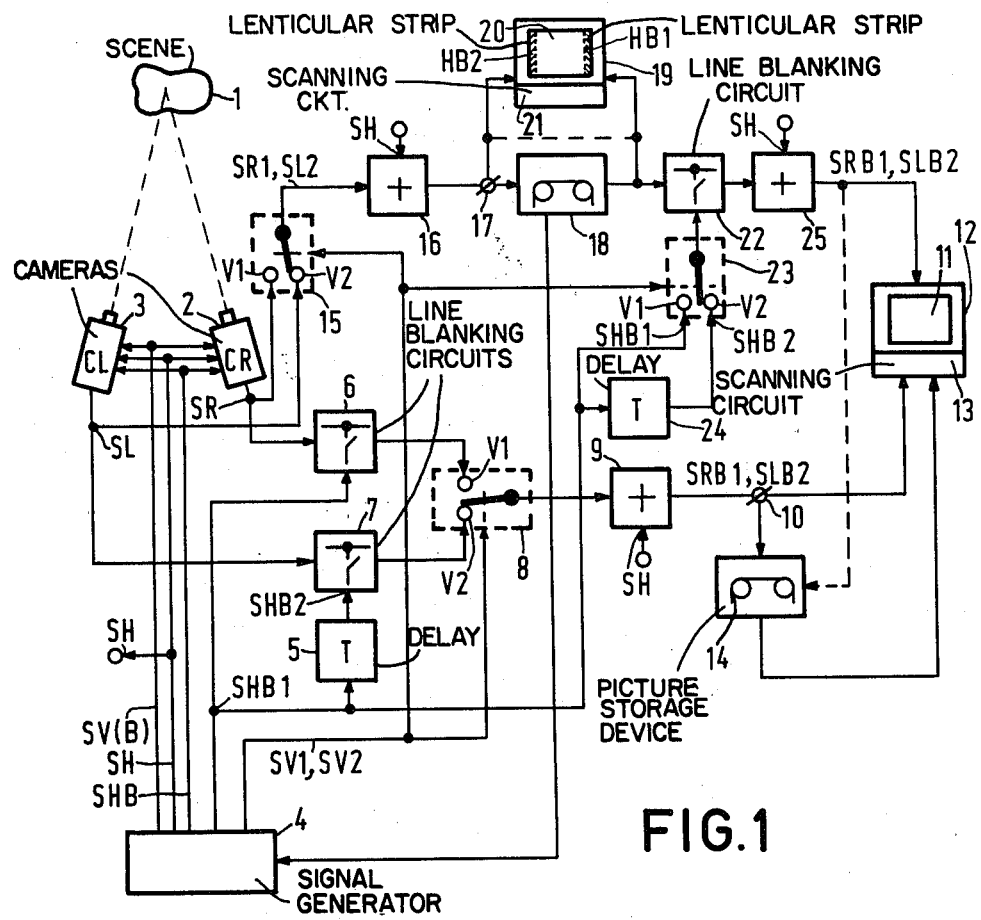
FIG. 1 is a block schematic circuit diagram of an embodiment of a three-dimensional television picture display system in accordance with the invention.

Referring to FIG. 1, reference numeral 1 denotes a scene which is recorded from two different angles by two television cameras 2 and 3. The camera 2 (CR) and 3 (CL), respectively, correspond to the right and left eyes, respectively, of a viewer. Under the control of a signal generator 4, which produces, for example, a field synchronizing and field blanking signal SV(B), a line synchronizing signal SH and a line blanking signal SHB, the cameras 2 and 3 supply picture signals SR and SL, respectively, during a line-by-line and field-by-field processing of the scene information in a manner which is customary for television. In addition, the signal generator 4 produces a line blanking signal SHB1 and a field change-over signal SV1, SV2.

Figure 2:
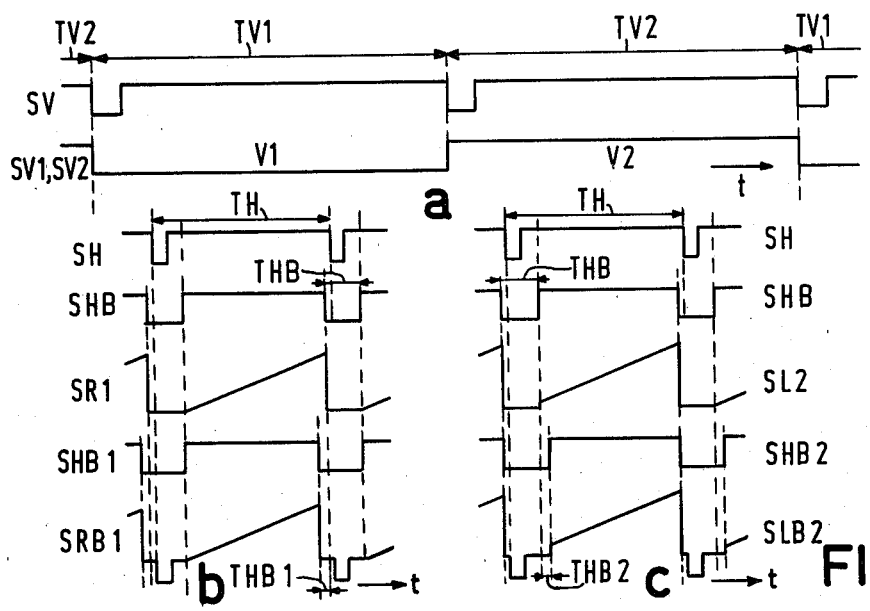
FIG. 2 shows, to explain the operation of the system of FIG. 1, some signal variations as a function of the time, FIG. 2a holding for approximately two field periods, and FIGS. 2b and 2c, respectively, holding for approximately one line period occurring in a first and a second field period, respectively.

In FIG. 2 some signal variations are plotted as a function of the time t. In FIG. 2a a field synchronizing signal SV is plotted over approximately two field periods TV, TV1 and TV2 representing two different field periods which are each associated with a first and a second image V1 and V2, which together form an interlaced picture on display. To enable a distinction between the first and second images V1 and V2 of a picture, the signal SV1 and SV2 are given which vary, for example, as shown in FIG. 2a. In FIGS. 2b and 2c, respectively, signals are plotted over approximately a line period TH which occurs in the respective first and second field periods TV1 and TV2, respectively. In FIGS. 2b and 2c the line synchronizing signal SH and the line blanking signal SHB are plotted as identical signals. The signals SH and SHB are substantially of a form such as they are fixed in television standards. For, for example, the CCIR 625-line standard, it holds, at a line period TH=64 $\mu$s, that a line blanking period THB has a duration of 11.8 to 12.3 $\mu$s, a pulse in the line synchronizing signal SH has a duration of 4.6 to 4.8 $\mu$s, a duration of 1.3 to 1.8 $\mu$s holding for the what is commonly referred to as the front porch, that is to say the duration between the negative-going pulse edges in the signals SHB and SH. From this it follows that the what is commonly referred to as the back-porch, the remaining duration in the line blanking period THB, has a duration of 5.2 to 6.4 $\mu$s.

FIG. 2b shows the picture signal SR1 as it is produced in, for example, a line period TH in the first image V1 in the field period TV1 by the camera 2. The picture signal SL2 produced by the camera 3 in the corresponding line period TH in the second image V2 with the field period TV2 is plotted in FIG. 2c. In FIGS. 2b and 2c the signals SR1 and SL2 are shown with a somewhat shifted information in the line scanning period (TH-THB).

The line blanking signal SHB1 is plotted in FIG. 2b, the descending pulse leading edge occurring before it is produced in the signal SHB and the ascending pulse leading edges in both signals SHB and SHB1 being produced simultaneously. In FIG. 1 it is shown that the signal SHB1 is applied to a delay device 5 (T) which produces a line blanking signal SHB2. FIG. 2c shows the line blanking signal SHB2 resulting from the delay, the descending pulse leading edges in the signals SHB and SHB2 being produced simultaneously and the ascending pulse trailing edge in the signal SHB2 being produced at a later moment than that in the signal SHB. Instead of forming the signal SHB2 by delaying the signal SHB1, thoughts might alternatively go towards a direct generation from the signal SHB.

In FIG. 1 the signal SHB1 also applied to a control input of a line blanking circuit 6 which includes a signal input to which the signal SR, supplied by the camera 2, is applied. The signal SHB2 is applied to a control input of a line blanking circuit 7 which has a signal input to which the signal SL, supplied by the camera 3, is applied. The outputs of the circuit 6 and 7, respectively, are connected to inputs of a change-over device 8. A control input of the change-over device 8 is connected to the generator 4 output on which the field change-over signal SV1, SV2 is present. As a result thereof, an output of the change-over device 8 is connected in the first field period TV1 (FIG. 2a) to the output of the camera 2 and in the second field period TV2 to the output of the camera 3. At the change-over device 8 the passing-on of the information associated with a first and a second image V1 and V2, respectively, is denoted by the same reference at contacts connected to the respective inputs.

The output of the change-over device 8 is connected to an input of an adder circuit 9 to a further input of which the line synchronizing signal SH produced by the signal generator 4 is applied. The output of the adder circuit 9 is connected to an output terminal 10 of a picture pick-up device (2–10) formed thus. The output terminal 10 carries a signal SRB1, SLB2, the signal SRB1 for the duration of one line period in the first field period TV1 being shown in FIG. 2b, and the signal SLB2 for the duration of one line period in the second field period TV2 being shown in FIG. 2c. The signal SRB1 of FIG. 2b is represented as a video signal in which the line blanking has been increased by a period of time THB1 at the end of the line scan. For the signal SLB2 of FIG. 2c, it follows that in the video signal, the line blanking is increased by a period of time THB2 at the beginning of the line scan. For these periods of time it holds that THB1=THB2=T, T being the time delay of the delay device 5.

On displaying the signal SRB1, SLB2 present on the output terminal 10, on a display screen 11 of a picture display device 12 by means of the scanning means 13 provided therein, the result is that at the left-hand side of the screen 12, where the line scan starts, scene information is present, produced by the signal SRB1, but that the scene information in the signal SLB2 is blanked. For the right-hand side of the screen 11 it follows that scene information is indeed displayed there from the signal SLB2, but not from the signal SRB1. Starting from the general rule for three-dimensional display that scene information intended for the left and the right eye, respectively, of a viewer is observed by that eye only this results in that, irrespective of the construction of the display device 12, the right eye is and the left eye is not supplied with scene information from the left-hand side of the screen 11, while this situation is reversed for the right-hand side of the screen 11. This corresponds to a direct observation of the scene 1 by the eyes of an observer via a window. Namely, the vertical posts of the window cover a right-hand and left-hand portion, respectively, of the scene for the right and left eye, respectively. Without the above-described shifted line blanking the right and left eye would receive scene information from as far as the side edges of the screen 11, which gives the observer a conflicting depth information, which results in eye strain and headache.

As regards the periods of time mentioned in the foregoing, it holds that in practice, depending on the content of the scene and the viewing distance, a period of time THB1=THB2 equal to 1 up to approximately 3 $\mu$s is very satisfactory. The overall line blanking period is then increased by 2 to 6 $\mu$s.

In the foregoing it was stated that the specific construction of the picture display device 12 is irrelevant. The only important factor is that in the system of FIG. 1 the scene information intended for the right and the left eye, respectively, of the observer reaches only that eye from the display screen 11. This situation is obtained when the observer uses spectacles having glasses of oppositely polarized material, the first and second image, respectively, being observed via a correspondingly polarized glass plate. For an example reference is made to U.S. Pat. No. 2,845,618. Further thoughts might go towards spectacles having glasses provided with a shutter, one eye and the other eye, respectively, being uncovered in synchronism with the display of the images. For an example, reference is made to U.S. Pat. No. 3,737,567. Furthermore, thoughts may go towards the use of lenticular strips on the display screen 11 (for example known from U.S. Pat. No. 2,783,406). Besides that, it is not an absolute requirement to perform a field-sequential picture build-up, in a manner described for FIG. 1, in two consecutive field periods TV1 and TV2. A line-sequential picture build-up would also be possible. The only important fact is that two independent images must be formed, consecutively in time (field-sequential) or simultaneously (line-sequentially), which pass only information to the associated eye.

The picture display device shown in FIG. 1 may be suitable for both black-white and color television. In addition, the device 12 may be part of a projection television system, the screen 11 being the display screen of a projection picture tube and the picture generated thereon being displayed onto a projection screen (not shown) by optical means.

In FIG. 1 it is shown that the output terminal 10 of the picture pick-up device (2–10) is connected to an input of a picture storage device 14, which has an output which is connected to an input of the display device 12. The picture storage device 14 may, for example, store the pictures on a tape or a disk. Separate inputs are shown for the display device 12, but these inputs may, however, alternatively be combined to one single input.

FIG. 1 shows a further construction of a picture pick-up device comprising a change-over device 15, an adder circuit 16 and an output terminal 17. Two inputs having contacts V1 and V2 of the change-over device 15 are connected to the respective outputs of the cameras 2 and 3. A control input of the device 15 is supplied with the field change-over signal SV1, SV2 from the generator 4 and the output, carrying the signal SR1, SL2 is connected to an input of the adder circuit 16. The line synchronizing signal SH is applied to a further input of the adder circuit 16, causing the output, which is connected to the output terminal 17, to carry a signal combination of the signals SR1, SL2 and SH, which signals are shown in FIG. 2b and 2c.

The output terminal 17 of a picture pick-up device (2–4, 15–17) thus formed is connected to an input of a picture storage device 18 and to an input of a display device 19. The output of the picture storage device 18 is connected to either another or to the same input of the display device 19. The device 19 is provided with a display screen 20 and scanning means 21 intended therefor.

If the signal SR1, SL2, which is applied in combination with the line synchronizing signal SH, is displayed on the display screen 20 without further measures, it would result in the above-described manner with conflicting depth information on either side of the screen 20. In accordance with the invention, vertical strips HB1 and HB2 are applied at either side on the display screen 20, which, when provided on the right and on the left, respectively, do not pass information generated on the screen 20 intended for the right and left-eye, respectively, of the observer of the screen 20. Instead of employing an electronic adaptation of the line blanking periods THB to the durations THB1 and THB2, described for the display device 12, the display device 19 employs a non-electronic adaptation. This adaptation may be used in a very simple manner in three-dimensional display systems based on the use of polarization and on the use of lenticular strips. Herein the strips HB1 and HB2 are strips of properly polarized material, or they consist of a plurality of strips which, by way of cover, are provided in the proper location at the lenticular strips. The width of the strips HB1 and HB2 is primarily dependent on the width of the display screen 20. When the diagonal across the display screen 20 is equal to 66 cm, a width of, for example, 3 cm may be selected for the strips HB1 and HB2, 1 cm width approximately corresponding to 1 $\mu$s during line scanning.

The optimum width of the strips HB1 and HB2 does not only depend on the screen width and the viewing distance of the observer, but also on the content of the scene and on what happens in the foreground and in the background. To create the possibility for the observer to make his own choice as regards the depth information he wants at the side edges of the screen 20, the strips HB1 and HB2 may be movable in the horizontal direction.

For the display device 19, the strips HB1 and HB2 may be provided in a detachable manner in front of the screen 20. They may, for example, be folded sidewards, the device 19 then being suitable for two-dimensional television display.

Instead of constructing the device 19 as a direct-vision device, said device 19 may be part of a projection picture display device. The screen 20 then is the display screen of a projection picture tube directed to a projection screen, not shown in FIG. 1. Also this arrangement operates as described in the foregoing.

If polarized-material strips HB1 and HB2 are employed, these strips will, in general terms, produce a local reduction of the picture brightness in the event of a polarization which is not optimum. The information to be passed is then of a reduced brightness, which may be noticable to the observer in the displayed picture. This effect may be negated by providing a removable neutral-density filter between the strips HB1 and HB2. The use of a neutral-density filter has the further advantage that reflections caused by extraneous light on the display screen 20 are reduced.

Via the dashed connection shown in FIG. 1, the output terminal 17 may be directed connected to a signal input of a line blanking circuit 22. It is further shown that the signal input of the line blanking circuit 22 is connected to the output of the picture storage device 18, whose input is connected to the terminal 17. In the line blanking circuit 22, the signal SR1, SL2 is provided with the shifted line blanking, either immediately after generation or at a later moment after storage. When signal processing is effected from the picture storage device 18, said device, applies a start-synchronizing signal to the signal generator 4. A control input of the circuit 22 is connected to an output of a change-over device 23, which has two inputs, connected to contacts V1 and V2, for receiving the respective line blanking signals SHB1 and SHB2, which are produced directly and via a delay device 24, respectively, by the signal generator 4. The output of the line blanking circuit 22 is connected to an input of an adder circuit 25 to a further input of which the line synchronizing signal SH is applied. In response thereto the output of the adder circuit 25 carries the signal SRB1, SLB2 which is applied to the display device 12 and/or, via the dashed-line connection, to the picture storage device 14.

In the event that a pseudo-three-dimensional system is used in which the information in the images intended for the left and the right eye is identical and has only been shifted in the horizontal direction, the shifted line blanking may also be employed, which results in an improvement of the depth sensation.

What is claimed is:

1. A three-dimensional television picture display system comprising a picture pick-up device and a picture display device having a picture display screen and scanning means for performing, in scanning periods and with blanking periods, a periodic scanning operation of the screen at line and field frequency for generating on the screen a picture corresponding to the original scene recorded with the pick-up device, information which is intended for the right and for the left-eye, respectively, of an observer being present in this picture in first and second images, respectively, the images being shifted in the direction of line scan, which, for an entire, image information-separated observation with two eyes, results in a three-dimensional picture, characterized in that said system further comprises means for shifting the periodic line blanking of the second image relative to the periodic line blanking of the first image in the direction of line scan.

2. A system as claimed in claim 1, wherein said picture pick-up device comprises a first and a second television camera which, on recording, represent the right and left eye, respectively, and a signal generator for producing line and field synchronizing and blanking signals, characterized in that said shifting means is incorporated in the picture pick-up device, and said shifting means comprises a first and a second line blanking circuit, each having a control input for receiving a line blanking signal and a signal input for connection to an output of the first and the second television camera, respectively, said camera outputs carrying signals representing the scene, a line blanking signal output of said signal generator being connected to the control input of the first line blanking circuit and, via a delay device, to the control input of the second line blanking circuit, the outputs of the said first and second line blanking circuits are connected to respective inputs of a change-over device, a control input thereof being connected to a field change-over output of the signal generator, and an output of said change-over device being coupled to an output terminal of the picture pick-up device.

3. A system as claimed in claim 1, wherein the picture pick-up device comprises a first and a second television camera which, on recording, represent the right and left eye, respectively, and a signal generator for producing line and field synchronizing and blanking signals, characterized in that outputs of the first and the second television camera carrying signals representing the scene are connected to inputs of a first change-over device which has a control input which is connected to an output of the generator for carrying a field-change-over signal, an output of said first change-over device being coupled to a signal input of a line blanking circuit which has a signal output for connection to an input of the picture display device, and a control signal input for receiving a line blanking signal, this control input being connected to an output of a second change-over device which has a first and a second signal input which are connected directly and via a delay device, respectively, to an output of the signal generator for carrying a line blanking signal, said second change-over device having a control input which is connected to an output of the signal generator for carrying a field change-over signal.

4. A system as claimed in claim 1, characterized in that said shifting means is incorporated in said picture display device, said shifting means comprising vertical strips being removably provided transversely of the direction of line scan on opposite sides of the display screen of the picture display device, the strips present on the display screen at the beginning and at the end of the line scan, respectively, not transmitting the information locally generated in the second and first image, respectively, intended for the left and right eye, respectively, of the observer.

5. A picture display device as claimed in claim 4, characterized in that the said vertical strips are movable in horizontal direction at the edge of the display screen.

6. A picture display device as claimed in claim 4 or 5, characterized in that a removable neutral-density filter is provided on the display screen between said vertical strips.

7. A system as claimed in claim 4, characterized in that the picture display device is a projection picture display device wherein said vertical strips are removably provided on the remotely located display screen thereof.

* * * * *